(12) United States Patent
Song et al.

(10) Patent No.: US 10,921,666 B2
(45) Date of Patent: Feb. 16, 2021

(54) ARRAY SUBSTRATE AND LIQUID CRYSTAL DISPLAY PANEL

(71) Applicant: Shenzhen China Star Optoelectronics Technology Co., Ltd., Guangdong (CN)

(72) Inventors: Qiaoqiao Song, Guangdong (CN); Mengmeng Zhang, Guangdong (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 337 days.

(21) Appl. No.: 15/781,489

(22) PCT Filed: Jan. 26, 2018

(86) PCT No.: PCT/CN2018/074345
§ 371 (c)(1),
(2) Date: Jun. 5, 2018

(87) PCT Pub. No.: WO2019/029137
PCT Pub. Date: Feb. 14, 2019

(65) Prior Publication Data
US 2020/0272004 A1  Aug. 27, 2020

(30) Foreign Application Priority Data
Aug. 9, 2017 (CN) .......................... 2017 1 0676212

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/13624* (2013.01);
(Continued)

(58) Field of Classification Search
CPC ................ G02F 1/13624; G02F 2001/134345
See application file for complete search history.

(56) References Cited

U.S. PATENT DOCUMENTS

| 2013/0002704 A1 | 1/2013 | Kamada | |
| 2015/0138464 A1* | 5/2015 | Okazaki | G02F 1/13306 349/37 |

(Continued)

FOREIGN PATENT DOCUMENTS

| CN | 102866547 A | 1/2013 |
| CN | 104199227 A | 12/2014 |

(Continued)

OTHER PUBLICATIONS

CN 2017106762125—1st Office Action.

*Primary Examiner* — Alexander P Gross
(74) *Attorney, Agent, or Firm* — Leong C. Lei

(57) ABSTRACT

An array substrate and a liquid crystal display panel are provided. The array substrate includes sub-pixel groups arranged in an array and each including first and second sub-pixels and a third switch assembly. The first sub-pixel includes a first main-zone electrode, a first sub-zone electrode, and a first switch assembly. The second sub-pixel includes a second main-zone electrode, a second sub-zone electrode, and a second switch assembly. The second switch assembly controls conduction of the second main-zone electrode and the second sub-zone electrode. The third switch assembly is connected to the first and second sub-zone electrodes and controls connection and conduction between the first and second sub-zone electrodes to reduce voltages of the first and second sub-zone electrodes. The array substrate helps reduce the number of switch units involved, simplifies the structure of pixels, lowers down fabrication cost, and also increases an aperture ratio of the liquid crystal display panel.

14 Claims, 3 Drawing Sheets

(52) U.S. Cl.
CPC ............... *G02F 1/134309* (2013.01); *G02F 2001/134345* (2013.01); *G02F 2201/40* (2013.01); *G02F 2201/52* (2013.01)

(56) References Cited

U.S. PATENT DOCUMENTS

2016/0202522 A1\* 7/2016 Lee .................. G02F 1/133514
                                                                    349/106
2018/0197495 A1\* 7/2018 Xu ....................... G02F 1/1368

FOREIGN PATENT DOCUMENTS

| CN | 104345513 A | | 2/2015 | | |
|----|-------------|---|---------|---|---|
| CN | 104375343 A | | 2/2015 | | |
| CN | 105139821 A | \* | 12/2015 | ....... | G02F 1/134336 |
| CN | 106019743 A | | 10/2016 | | |
| CN | 106249498 A | | 12/2016 | | |
| CN | 106950768 A | | 7/2017 | | |

\* cited by examiner

ARRAY SUBSTRATE AND LIQUID CRYSTAL DISPLAY PANEL

CROSS REFERENCE TO RELATED APPLICATIONS

This application claims the priority of Chinese Patent Application No. 2017106762125 filed on Aug. 9, 2017, titled "Array Substrate and Liquid Crystal Display Panel", the disclosure of which is incorporated herein by reference in its entirety.

BACKGROUND OF THE INVENTION

1. Field of the Invention

The present invention relates to the field of liquid crystal display panel, and more particularly to an array substrate and a liquid crystal display panel.

2. The Related Arts

Due to the advantages of wild view angle and high contrast, vertical alignment (VA) liquid crystal display panels are becoming a mainstream product in the market. FIG. 1 is a schematic view illustrating an equivalent circuit of a pixel unit of a conventional liquid crystal display panel. A pixel electrode of each pixel unit is made up of two portions, a main-zone electrode and a sub-zone electrode. The main-zone electrode is driven by means of a thin-film transistor T1 and the sub-zone electrode is driven by means of thin-film transistors T2, T3. Specifically, the liquid crystal display panel is operable through driving by means of row-by-row scanning. When the scanning is conducted on the nth row, a scanning signal present on a scan line Gate n is of a high level, while a scanning signal on a scan line Gate n+1 is of a low level so that the thin-film transistors T1 and T2 are conducted on and the thin-film transistor T3 is cut off. Under the action of a data signal present on a data line Data n, a liquid crystal capacitor CU and a storage capacitor Cst1 formed by the main-zone electrode and a common electrode com and a liquid crystal capacitor Clc2 and a storage capacitor Cst2 formed by the sub-zone electrode and the common electrode com begin to charge to reach a voltage of the data signal so that the electrical voltages of the main-zone electrode and the sub-zone electrode both reach the voltage of the data signal. When the scanning is conducted on the (n+1)th row, the scanning signal of the scan line Gate n becomes a low level and the scanning signal of the scan line Gate n+1 becomes a high level, so that the transistors T1 and T2 are cut off and the thin-film transistor T3 is conducted on, whereby the voltage of the sub-zone electrode begins to change and eventually resulting in a predetermined difference from the voltage of the main-zone electrode. Low color shifting is made possible through such a voltage difference. In a liquid crystal display panel of such a structure, each pixel unit is necessarily made up of three thin-film transistors. Thus, the structure is complicated and the aperture ratio is low.

Thus, it is desired to provide an array substrate and a liquid crystal display panel that overcome the deficiencies of the prior art.

SUMMARY OF THE INVENTION

An objective of the present invention is to provide an array substrate, which allows for simplification of a pixel structure and increases an aperture ratio of a liquid crystal display panel.

Another objective of the present invention is to provide a liquid crystal display panel that involves the above array substrate.

To achieve the above objectives, an embodiment of the present invention provides the following technical solution:

The present invention provides an array substrate, which comprises a plurality of sub-pixel groups arranged in an array. Each of the sub-pixel groups comprises a first sub-pixel, a second sub-pixel, and a third switch assembly. The first sub-pixel comprises a first main-zone electrode, a first sub-zone electrode, and a first switch assembly. The first switch assembly controls conduction of the first main-zone electrode and the first sub-zone electrode. The second sub-pixel comprises a second main-zone electrode, a second sub-zone electrode, and a second switch assembly. The second switch assembly controls conduction of the second main-zone electrode and the second sub-zone electrode. The third switch assembly is connected to the first sub-zone electrode and the second sub-zone electrode. The third switch assembly controls connection and conduction between the first sub-zone electrode and the second sub-zone electrode to reduce voltages of the first sub-zone electrode and the second sub-zone electrode.

In the above, a plurality of scan lines is further included. Multiple ones of the sub-pixel groups of each of rows correspond to one of the scan lines. The third switch assembly comprises a first connection terminal, a second connection terminal, and a control terminal. The first connection terminal is connected to the first sub-zone electrode. The second connection terminal is connected to the second sub-zone electrode. The control terminal is connected one of the scan lines to which sub-pixels of an adjacent one of the rows correspond.

In the above, a plurality of data lines are further included and are arranged to intersect the plurality of scan lines. The first switch assembly comprises a first thin-film transistor and a second thin-film transistor. The second switch assembly comprises a third thin-film transistor and a fourth thin-film transistor. The first thin-film transistor has a gate electrode connected to a first scan line, a source electrode connected to a first data line, and a drain electrode connected to the first main-zone electrode. The second thin-film transistor has a gate electrode connected to the first scan line, a source electrode connected to the first data line, and a drain connected to the first sub-zone electrode. The third thin-film transistor has a gate electrode connected to the first scan line, a source electrode connected to the second data line, and a drain electrode connected to the second sub-zone electrode. The fourth thin-film transistor has a gate electrode connected to the first scan line, source electrode connected to the second data line, and a drain electrode connected to the second main-zone electrode.

In the above, the third switch assembly comprises a fifth thin-film transistor. One of the first connection terminal and the second connection terminal is a source electrode and another one is a drain electrode. The control terminal is a gate electrode.

In the above, the first sub-pixel and the second sub-pixel are of a same color and sub-pixel groups that are on a same column but are respectively on adjacent rows are of different colors.

In the above, the sub-pixel groups are each of a color of one of red, green, and blue.

In the above, the first sub-pixel and the second sub-pixel are each of an 8-domain structure.

In the above, the first main-zone electrode, the first sub-zone electrode, the second main-zone electrode, and the second sub-zone electrode are each of a 4-domain structure.

In the above, the first main-zone electrode has a potential that is greater than a potential of the first sub-zone electrode; and the second main-zone electrode has a potential that is greater than a potential of the second sub-zone electrode.

The present invention also provides a liquid crystal display panel, which comprises an array substrate as described above in any of the above paragraphs.

The embodiments of the present invention provide the following advantages or beneficial effects:

In the present invention, two adjacent sub-pixels of sub-pixel groups are connected through a switch unit, such that a third switch assembly connects two sub-zone electrodes that correspond to two sub-pixels of a same one of the pixel groups. The third switch assembly controls connection and conduction between the first sub-zone electrode and the second sub-zone electrode to reduce the voltages of the first sub-zone electrode and the second sub-zone electrode to achieve an effect of wide view angle displaying. The array substrate of the present invention helps reduce the number of switch units used, simplifies the array substrate, lowers down fabrication cost, and also increases an aperture ratio of a liquid crystal display panel.

BRIEF DESCRIPTION OF THE DRAWINGS

To more clearly explain the technical solution proposed in an embodiment of the present invention and that of the prior art, a brief description of the drawings that are necessary for describing the embodiment or the prior art is given as follows. It is obvious that the drawings that will be described below show only some embodiments of this application. For those having ordinary skills of the art, other drawings may be readily available from these attached drawings without the expense of creative effort and endeavor.

DETAILED DESCRIPTION OF THE PREFERRED EMBODIMENTS

Figure 1:
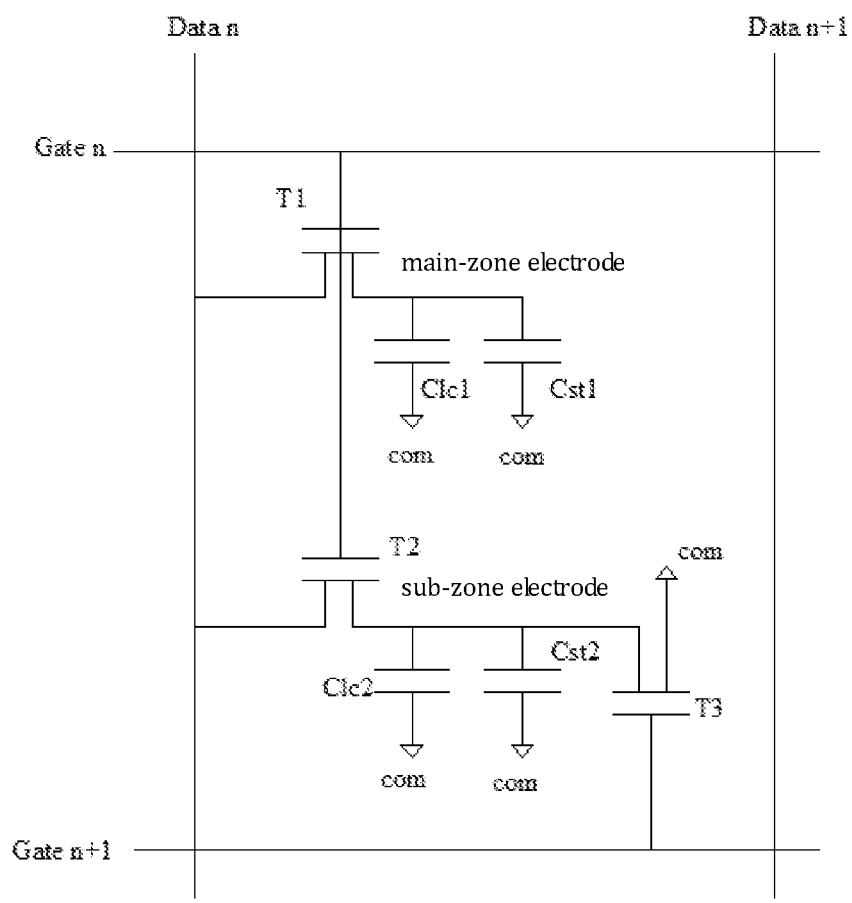
FIG. 1 is a schematic view illustrating an equivalent circuit of a conventional array substrate.
Figure 2:
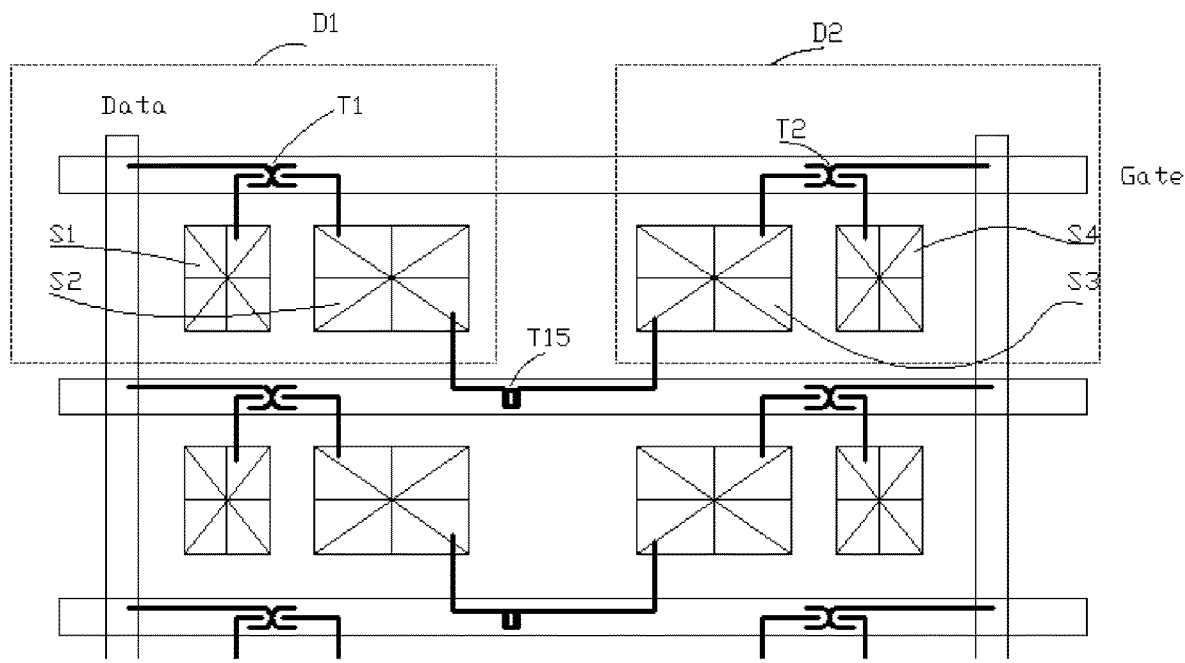
FIG. 2 is a schematic view illustrating an array substrate according to an embodiment of the present invention.

A clear and complete description will be given to technical solutions provided by embodiments of the present invention with reference to the attached drawings of the embodiments of the present invention. However, the embodiments so described are only some, but not all, of the embodiments of the present invention. Based on the embodiment of the present invention, other embodiments are available to those having ordinary skills of the art without the expense of creative effort and endeavor and are considered belonging to the scope of protection of the present invention.

In addition, the description given below for each embodiment is made with reference to the attached drawings to exemplify specific embodiments that the present invention may be put into practice. Direction related terminology used in the present invention, such as "up", "down", "front", "rear", "left", "right", "internal", "external", and "lateral", is provided as direction defined in the drawing sheets. Thus, using the direction related terminology, which is for better and more clearly describing and understanding of the present invention and is not for indicating or implying any specific orientation that a device or an element described must take or the device or element must be structured or operated at a specific orientation, should thus be appreciated as not imposing constraints to the present invention.

In the description of the present invention, it should be noted that unless specifically required and set, the terms "installation", "connection", and "jointing" as used herein should be interpreted in a broad way, such as being fixedly connected or removably connected, or integrally connected; or being mechanically connected; or being directly connected, or indirectly connected with intervening media therebetween, or interiors of two element being in communication with each other. For those having ordinary skills in the art, the specific meaning of these terms used in the present invention can be appreciated for any actual situations.

Further, in the description of the present invention, unless stated otherwise, "multiple" means two or more than two. Terms related to "operations", if used in this specification, should means independent operations and for cases where distinction from other operations, any operation that achieve a desired effect of the operation is included in the terms so used. Further, the symbol "–" as used in this specification stands for a numeral range, which comprises a range of which the minimum and the maximum are respectively the figures set in front of and behind "–". In the drawings, units having similar or the same structure are designated with the same reference numerals.

Referring to FIG. 1, FIG. 1 is a schematic view illustrating an array substrate according to an embodiment of the present invention. The instant embodiment comprises a plurality of sub-pixel groups arranged in an array. Each of the sub-pixel groups comprises a first sub-pixel D1, a second sub-pixel D2, and a third switch assembly T15. Specifically, the first sub-pixel D1 and the second sub-pixel D2 of a same one of the sub-pixel groups are of the same color. In other words, each of the sub-pixel groups displays one color. Adjacent ones of the sub-pixel groups are of different colors. It is appreciated that the plurality of sub-pixel groups that are arranged in an array have be of a color of one of red, green, and blue.

Specifically, the first sub-pixel D1 comprises a first main-zone electrode S1, a first sub-zone electrode S2, and a first switch assembly T1. The second sub-pixel D2 comprises a second main-zone electrode S4, a second sub-zone electrode S3, and a second switch assembly T2. The first switch assembly T1 controls conduction of the first main-zone electrode S1 and the first sub-zone electrode S2 in order to apply different voltages to cause liquid crystal contained in pixel zones that are respectively corresponding to the first main-zone electrode S1 and the first sub-zone electrode S2 to exhibit different rotating angles. Specifically, adjacent sub-pixels respectively undergo positive polarity reverse driving and negative polarity reverse driving to suppress color shifting between the adjacent sub-pixels. The second switch assembly T2 controls conduction of the second main-zone electrode S4 and the second sub-zone electrode S3 in order to apply different voltages to cause liquid crystal contained in pixel zones that are respectively corresponding to the second main-zone electrode S4 and the second sub-zone electrode S3 to exhibit different rotating angles, allowing for transmission of predetermined amounts of light to thereby improve color shifting at a large view angle.

In a feasible embodiment of the present invention, the first sub-pixel D1 and the second sub-pixel D2 are each of an 8-domain structure. More specifically, the first main-zone electrode S1, the first sub-zone electrode S2, the second main-zone electrode S4, and the second sub-zone electrode S3 are each of a 4-domain structure. In other words, each sub-pixel is of an 8-domain structure, and the main zone and the sub zone of each sub-pixel are each of a 4-domain structure. In comparison of a sub-pixel structure that is an 8-domain structure with respect to a sub-pixel that is a 4-domain structure, the sub-pixel structure that is an 8-domain structure could help improve the phenomenon of color distortion at a large view angle.

The third switch assembly T15 is connected with the first sub-zone electrode S2 and the second sub-zone electrode S3. The third switch assembly T15 controls conduction of the first sub-zone electrode S2 and the second sub-zone electrode S3 such that the first sub-zone electrode and the second sub-zone electrode S3 share electrical charges with each other to thereby reduce voltages of the sub-zone electrodes (namely the first sub-zone electrode S2 and the second sub-zone electrode S3) to achieve an effect of wide view angle displaying.

In an embodiment of the present invention, two adjacent sub-pixels of the sub-pixel groups are connected through a switch unit, specifically the third switch assembly T15 connecting two sub-zone electrodes (namely the first sub-zone electrode S2 and the second sub-zone electrode S3) that correspond to two sub-pixels of a same one of the pixel groups. The third switch assembly T15 controls connection and conduction between the first sub-zone electrode S2 and the second sub-zone electrode S3 to lower the voltages of the first sub-zone electrode S2 and the second sub-zone electrode S3 to achieve the effect of wide view angle displaying. The array substrate of the instant embodiment helps reduce the number of switch units used, simplifies the array substrate, lowers down fabrication cost, and also increases an aperture ratio of the liquid crystal display panel.

Figure 3:
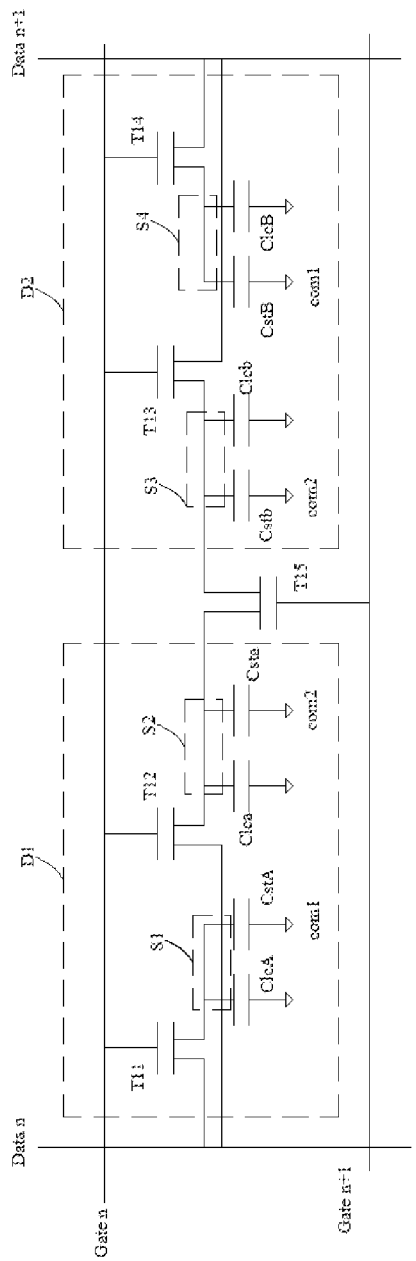
FIG. 3 is a schematic view illustrating the principle of circuit of the array substrate shown in FIG. 2.

Reference being had in combination with FIG. 3, in a feasible embodiment of the present invention, the array substrate further comprises a plurality of scan lines (namely Gate n, Gate n+1 illustrated in FIG. 3 as examples) and a plurality of data lines (namely Data n, Data n+1 illustrated in FIG. 3 as examples). The plurality of scan lines and the plurality of data lines are arranged to intersect each other. The plurality of sub-pixel groups are formed in intersection areas of the plurality of scan lines and the plurality of data lines. Specifically, multiples one of the sub-pixel groups that are located in a same row correspond to a same one of the scan lines, and the scan lines correspond, in a one-to-one manner, to rows of the pixel structures. Each of the sub-pixels corresponds, in a one-to-one manner, to one of the data lines.

More specifically, an nth scan line Gate n (such as a first scan line), an (n+1)th scan line Gate n+1 (such as a second scan line), an nth data line Data n (such as a first data line), and an (n+1)th data line Data n+1 (such as a second data line) intersect each other to form one of such sub-pixel groups. The first switch assembly T1 comprises a first thin-film transistor T11 and a second thin-film transistor T12. The second switch assembly T2 comprises a third thin-film transistor T13 and a fourth thin-film transistor T14. The first thin-film transistor T11, the second thin-film transistor T12, the third thin-film transistor T13, and the fourth thin-film transistor T14 have gate electrodes that are connected to the same scan line Gate n. It is appreciated that the scan line Gate n is the scan line to which the sub-pixel group corresponds. The thin-film transistor T11 has a source electrode that is connected to the nth data line Data n (such as the first data line), a drain electrode that is connected to the first main-zone electrode S1. The first main-zone electrode S1 and the Nth scan line Gate n collectively form a storage capacitor CstA, and the first main-zone electrode S1 and the common electrode com collectively form a main-zone liquid crystal capacitor CLcA. The thin-film transistor T12 has a source electrode that is connected to the nth data line Data n, a drain electrode that is connected to the first sub-zone electrode S2. The first sub-zone electrode S2 and the Nth scan line Gate n collectively form a storage capacitor Csta, and the first sub-zone electrode S2 and the common electrode com collectively form a main-zone liquid crystal capacitor CLca. The third thin-film transistor T13 has a source electrode that is connected to the data lines Data n+1, and the fourth thin-film transistor T14 has a source electrode that is connected to the data lines Data n+1. In other words, the drain electrodes of the first thin-film transistor T11 and the second thin-film transistor T12 and the drain electrodes of the third thin-film transistor T13 and the fourth thin-film transistor T14 are respectively connected to two adjacent data lines. The third thin-film transistor T13 a drain electrode that is connected to the second sub-zone electrode S3, and the fourth thin-film transistor T14 a drain electrode that is connected to the second main-zone electrode S4. The second sub-zone electrode S3 and the Nth scan line Gate n collectively form a storage capacitor Cstb, and the second sub-zone electrode S3 and the common electrode com collectively form a sub-zone liquid crystal capacitor CLcb. The second main-zone electrode S4 and the Nth scan line Gate n collectively form a storage capacitor CstB, and the second main-zone electrode S4 and the common electrode com collectively form a main-zone liquid crystal capacitor CLcB.

The third switch assembly T15 comprises a first connection terminal a second connection terminal and a control terminal. The first connection terminal is connected to the first sub-zone electrode S2; the second connection terminal is connected to the second sub-zone electrode S3; and the control terminal is connected to the scan line Gate n+1 to which the adjacent row of sub-pixel groups corresponds. Preferably, the third switch assembly T15 comprises a fifth thin-film transistor; the first connection terminal can be a source electrode and correspondingly, the second connection terminal is a drain electrode and the control terminal is a gate electrode. In other embodiments of the present invention, the first connection terminal can alternatively be the drain electrode, and correspondingly, the second connection terminal is the source electrode.

During an operation of the liquid crystal display panel, to drive the first sub-pixel D1, a scan signal on the nth scan line Gate n is of a high level and the first thin-film transistor T11 and the second thin-film transistor T12 are conducted on so that a driving voltage of the nth data line Data n is fed through the first thin-film transistor T11 and the second thin-film transistor T12 to the first main-zone electrode S1 and the first sub-zone electrode S2. At the same time, the common electrode com that corresponds to the first main-zone electrode S1 is supplied with a constant voltage, so that a first voltage difference d1 is established between the first main-zone electrode S1 and the common electrode com; and the common electrode com that corresponds to the first sub-zone electrode S2 is supplied with a periodically reversing voltage so that a second voltage difference d2 is established between the first sub-zone electrode S2 and the common electrode com. Specifically, a difference between the first voltage difference d1 and the second voltage difference d2 can be set as desired so that liquid crystal contained in a pixel zone that corresponds to the first main-zone electrode and liquid crystal contained in a pixel zone that corresponds to the first sub-zone electrode are rotated with an angle difference therebetween to thereby reduce color shifting.

To drive the second sub-pixel D2, a scan signal on the nth scan line Gate n is of a high level and the third thin-film transistor T13 and the fourth thin-film transistor T14 are conducted on so that a driving voltage of the (n+1)th data line Data n+1 is fed through the thin-film transistor T11 to the second main-zone electrode S4 and the second sub-zone electrode S3. At the same time, the common electrode com that corresponds to the second main-zone electrode S4 is supplied with a constant voltage, so that a first voltage difference d1 is established between the second main-zone electrode and the common electrode com; and the common electrode com that corresponds to the second sub-zone electrode S3 is supplied with a periodically reversing voltage so that a second voltage difference d2 is similarly established between the second sub-zone electrode S3 and the common electrode com. Similarly, a difference between the first voltage difference d1 and the second voltage difference d2 can be set as desired so that liquid crystal contained in a pixel zone that corresponds to the second main-zone electrode S4 and liquid crystal contained in a pixel zone that corresponds to the second sub-zone electrode S3 are rotated with an angle difference therebetween to thereby reduce color shifting. It is appreciated that under this condition, the fifth thin-film transistor T15 is shut off.

When the scan signal of the nth scan line Gate n is of a low level and the scan signal of the (n+1)th scan line Gate n+1 is of a high level, the drain electrodes of the first thin-film transistor T11 and the second thin-film transistor T12 and the third thin-film transistor T13 and the fourth thin-film transistor T14 are shut down and the fifth thin-film transistor T15 is conducted on so that the first sub-zone electrode S2 and the second sub-zone electrode S3 are connected with each other and discharge to each other to share electrical charges thereby lowering down voltages of the first sub-zone electrode S2 and the second sub-zone electrode S3 to achieve the effect of wide view angle displaying.

Under this condition, the potential of the sub-zone electrode is lower than that of the main-zone electrode. In an actual operation of lighting, the main-zone electrode would be relatively bright, while the sub-zone electrode is relatively dark, and liquid crystal molecules exhibit eight tilting directions to provide a better viewing angle.

The present invention also provides a liquid crystal display panel. The liquid crystal display panel comprises an array substrate according to any of the embodiments described above. It is appreciated that the liquid crystal display panel of the present invention is applicable to any electronic devices that include a display function, such as a mobile phone, a tablet computer, a television, a display, a notebook computer, a digital picture frame, and a navigation device.

In the description of the disclosure, the terms "an embodiment", "some embodiments", "an illustrative example", "a specific example", and "some examples" as used herein refer to specific features, structures, materials, or characteristics involved in the embodiment(s) or example(s) are included in at least one embodiment or example of the present invention. In the disclosure, expressions referring to the above mentioned terms may not be referring to the same embodiment or example. Further, the description of the specific features, structures, materials, or characteristics can be combined, through proper arrangements, in any specific one or multiple ones of embodiments or examples.

The embodiments provided above are not construed as limiting to the scope of protection of the technical solution proposed therein. Modifications, equivalent substitutes, and improvements that fall within the spirit and principle of these embodiments are considered belong to the scope of protection of the technical solutions.

What is claimed is:

1. An array substrate, comprising a plurality of sub-pixel groups arranged in an array, each of the sub-pixel groups comprising a first sub-pixel, a second sub-pixel, and a third switch assembly, the first sub-pixel comprising a first main-zone electrode, a first sub-zone electrode, and a first switch assembly, the first switch assembly controlling conduction of the first main-zone electrode and the first sub-zone electrode, the second sub-pixel comprising a second main-zone electrode, a second sub-zone electrode, and a second switch assembly, the second switch assembly controlling conduction of the second main-zone electrode and the second sub-zone electrode, the third switch assembly being connected to the first sub-zone electrode and the second sub-zone electrode, the third switch assembly controlling connection and conduction between the first sub-zone electrode and the second sub-zone electrode to reduce voltages of the first sub-zone electrode and the second sub-zone electrode;

wherein for each of the sub-pixel groups comprising the first sub-pixel, the second sub-pixel, and the third switch assembly, the third switch assembly comprises a fifth thin-film transistor, which comprises a source electrode and a drain electrode respectively serving as a first connection terminal and a second connection terminal, the fifth thin-film transistor further comprising a gate electrode to serve as a control terminal, wherein the source electrode and the drain electrode of the fifth thin-film transistor are respectively connected to the first and second sub-zone electrodes of the first and second sub-pixels of the sub-pixel group, such that the fifth thin-film transistor is selectively switched on to establish electrically conducting connection between the first and second sub-zone electrodes of the first and second sub-pixels of the sub-pixel group;

wherein the array substrate further comprises: a plurality of scan lines, multiple ones of the sub-pixel groups of each of rows corresponding to one of the scan lines, the third switch assembly comprising the first connection terminal, the second connection terminal, and the control terminal, the first connection terminal being connected to the first sub-zone electrode, the second connection terminal being connected to the second sub-zone electrode, the control terminal being connected one of the scan lines to which sub-pixels of an adjacent one of the rows correspond; and a plurality of data lines that are arranged to intersect the plurality of scan lines, the first switch assembly comprising a first thin-film transistor and a second thin-film transistor, the second switch assembly comprising a third thin-film transistor and a fourth thin-film transistor, the first thin-film transistor having a gate electrode connected to a first scan line, a source electrode connected to a first data line, and a drain electrode connected to the first main-zone electrode, the second thin-film transistor having a gate electrode connected to the first scan line, a source electrode connected to the first data line, and a drain electrode connected to the first sub-zone electrode, the third thin-film transistor having a gate electrode connected to the first scan line, a source electrode connected to a second data line, and a drain electrode connected to the second sub-zone electrode, the fourth thin-film transistor having a gate electrode connected to the first scan line, source electrode connected to the second data line, and a drain electrode connected to the second main-zone electrode.

2. The array substrate according to claim 1, wherein the sub-pixel groups are each of a color of one of red, green, and blue.

3. The array substrate according to claim 1, wherein the first main-zone electrode has a potential that is greater than a potential of the first sub-zone electrode; and the second main-zone electrode has a potential that is greater than a potential of the second sub-zone electrode.

4. The array substrate according to claim 1, wherein the first sub-pixel and the second sub-pixel are of a same color and sub-pixel groups that are on a same column but are respectively on adjacent rows are of different colors.

5. The array substrate according to claim 4, wherein the sub-pixel groups are each of a color of one of red, green, and blue.

6. The array substrate according to claim 1, wherein the first sub-pixel and the second sub-pixel are each of an 8-domain structure.

7. The array substrate according to claim 6, wherein the first main-zone electrode, the first sub-zone electrode, the second main-zone electrode, and the second sub-zone electrode are each of a 4-domain structure.

8. A liquid crystal display panel, comprising an array substrate, the array substrate comprising a plurality of sub-pixel groups arranged in an array, each of the sub-pixel groups comprising a first sub-pixel, a second sub-pixel, and a third switch assembly, the first sub-pixel comprising a first main-zone electrode, a first sub-zone electrode, and a first switch assembly, the first switch assembly controlling conduction of the first main-zone electrode and the first sub-zone electrode, the second sub-pixel comprising a second main-zone electrode, a second sub-zone electrode, and a second switch assembly, the second switch assembly controlling conduction of the second main-zone electrode and the second sub-zone electrode, the third switch assembly being connected to the first sub-zone electrode and the second sub-zone electrode, the third switch assembly controlling connection and conduction between the first sub-zone electrode and the second sub-zone electrode to reduce voltages of the first sub-zone electrode and the second sub-zone electrode;

wherein for each of the sub-pixel groups comprising the first sub-pixel, the second sub-pixel, and the third switch assembly, the third switch assembly comprises a fifth thin-film transistor, which comprises a source electrode and a drain electrode respectively serving as a first connection terminal and a second connection terminal, the fifth thin-film transistor further comprising a gate electrode to serve as a control terminal, wherein the source electrode and the drain electrode of the fifth thin-film transistor are respectively connected to the first and second sub-zone electrodes of the first and second sub-pixels of the sub-pixel group, such that the fifth thin-film transistor is selectively switched on to establish electrically conducting connection between the first and second sub-zone electrodes of the first and second sub-pixels of the sub-pixel group;

wherein the liquid crystal display panel further comprises: a plurality of scan lines, multiple ones of the sub-pixel groups of each of rows corresponding to one of the scan lines, the third switch assembly comprising the first connection terminal, the second connection terminal, and the control terminal, the first connection terminal being connected to the first sub-zone electrode, the second connection terminal being connected to the second sub-zone electrode, the control terminal being connected one of the scan lines to which sub-pixels of an adjacent one of the rows correspond; a plurality of data lines that are arranged to intersect the plurality of scan lines, the first switch assembly comprising a first thin-film transistor and a second thin-film transistor, the second switch assembly comprising a third thin-film transistor and a fourth thin-film transistor, the first thin-film transistor having a gate electrode connected to a first scan line, a source electrode connected to a first data line, and a drain electrode connected to the first main-zone electrode, the second thin-film transistor having a gate electrode connected to the first scan line, a source electrode connected to the first data line, and a drain connected to the first sub-zone electrode, the third thin-film transistor having a gate electrode connected to the first scan line, a source electrode connected to a second data line, and a drain electrode connected to the second sub-zone electrode, the fourth thin-film transistor having a gate electrode connected to the first scan line, source electrode connected to the second data line, and a drain electrode connected to the second main-zone electrode.

9. The liquid crystal display panel according to claim 8, wherein the sub-pixel groups are each of a color of one of red, green, and blue.

10. The liquid crystal display panel according to claim 8, wherein the first main-zone electrode has a potential that is greater than a potential of the first sub-zone electrode; and the second main-zone electrode has a potential that is greater than a potential of the second sub-zone electrode.

11. The liquid crystal display panel according to claim 8, wherein the first sub-pixel and the second sub-pixel are of a same color and sub-pixel groups that are on a same column but are respectively on adjacent rows are of different colors.

12. The liquid crystal display panel according to claim 11, wherein the sub-pixel groups are each of a color of one of red, green, and blue.

13. The liquid crystal display panel according to claim 8, wherein the first sub-pixel and the second sub-pixel are each of an 8-domain structure.

14. The liquid crystal display panel according to claim 13, wherein the first main-zone electrode, the first sub-zone electrode, the second main-zone electrode, and the second sub-zone electrode are each of a 4-domain structure.

* * * * *